US005132706A

United States Patent [19]

Yuasa et al.

[11] Patent Number: 5,132,706

[45] Date of Patent: Jul. 21, 1992

[54] TRANSFERRING INK WITH AN ADHESIVE CHARACTERISTIC CHANGED BY APPLIED VOLTAGE AND REPLACING COMPONENT LOSS OF INK IN RESPONSE TO DETERMINED CHANGES OF INK

[75] Inventors: Toshiya Yuasa, Mitaka; Motokazu Kobyashi, Yokohama; Kozo Arahara; Hiroshi Fukumoto, both of Kawasaki; Kenichi Matsumoto, Tokyo; Noboru Tohyama, Kawasaki; Takashi Kai, Hatano, all of Japan

[73] Assignee: Canon Kabushiki Kaisha, Tokyo, Japan

[21] Appl. No.: 507,471

[22] Filed: Apr. 11, 1990

[30] Foreign Application Priority Data

| | | | |
|---|---|---|---|
| Apr. 12, 1989 | [JP] | Japan | 1-90827 |
| May 18, 1989 | [JP] | Japan | 1-122749 |
| Jul. 24, 1989 | [JP] | Japan | 1-190947 |

[51] Int. Cl.[5] .......... B41M 5/00; B41M 5/20; G01D 15/16; B41J 2/005

[52] U.S. Cl. .......... 346/140 R; 101/465; 101/466; 101/489; 101/DIG. 37; 346/1.1

[58] Field of Search .......... 346/140 R, 1.1; 101/489, 465, 466, DIG. 37, 478

[56] References Cited

U.S. PATENT DOCUMENTS

| | | | |
|---|---|---|---|
| 4,580,143 | 4/1986 | Larson | 346/1.1 |
| 4,833,990 | 5/1989 | Hirt | 101/478 |
| 4,838,940 | 6/1989 | Kan et al. | 106/22 |
| 4,855,763 | 8/1989 | Kan et al. | |
| 4,881,084 | 11/1989 | Kan et al. | 346/1.1 |
| 4,920,361 | 4/1990 | Arahara et al. | 346/140 R |
| 4,945,833 | 8/1990 | Arahara et al. | 101/450.1 |
| 4,972,200 | 11/1990 | Arahara et al. | 346/1.1 |

FOREIGN PATENT DOCUMENTS

| | | |
|---|---|---|
| 0336238 | 10/1989 | European Pat. Off. . |
| 0352796 | 1/1990 | European Pat. Off. . |
| 1671577 | 3/1972 | Fed. Rep. of Germany . |
| 2200421 | 7/1972 | Fed. Rep. of Germany . |
| 2019868 | 10/1970 | France . |
| 2601900 | 1/1988 | France . |
| 62-90248 | 4/1987 | Japan . |
| 01-133776 | 5/1989 | Japan . |

OTHER PUBLICATIONS

R. M. Schaffert, Electrophotography, John Wiley and Sons, New York (1965).

Patent Abstracts of Japan, vol. 11, No. 296, Sep. 25, 1987.

*Primary Examiner*—Benjamin R. Fuller
*Assistant Examiner*—Scott A. Rogers
*Attorney, Agent, or Firm*—Fitzpatrick, Cella, Harper & Scinto

[57] ABSTRACT

There is provided a method and apparatus for forming an image which includes providing a recording composition capable of changing its adhesivity corresponding to the polarity of a voltage applied thereto between a pair of electrodes. The recording composition has a transfer characteristic having a tendency to change by loss of at least one component of the recording composition. A voltage is applied between the pair of electrodes to attach the recording composition to one of the pair of electrodes to attach the recording composition to one of the pair of electrodes. Any such change in the transfer characteristic of the recording composition is detected during the process. In response to any change in the transfer characteristic additional component is added to the recording composition to compensate for that change.

14 Claims, 8 Drawing Sheets

TRANSFERRING INK WITH AN ADHESIVE CHARACTERISTIC CHANGED BY APPLIED VOLTAGE AND REPLACING COMPONENT LOSS OF INK IN RESPONSE TO DETERMINED CHANGES OF INK

FIELD OF THE INVENTION AND RELATED ART

The present invention relates to an image forming method, and an image forming apparatus used therefor.

As peripheral equipment for recording used in conjunction with a computer, etc., there have been employed various printers utilizing various recording systems, such as laser beam printer, ink-jet printer, thermal transfer printer, wire dot printer and daisy-wheel printer.

With respect to such recording systems, our research group has proposed a recording method wherein a pattern of adhesiveness is chemically imparted to a specific ink and recording is effected by utilizing the resultant difference between the adhesiveness and non adhesiveness in the ink (Japanese Patent Application No. 175191/1986, corresponding to U.S. Pat. No. 4,881,084).

This recording method comprises:

providing a fluid ink which is capable of forming a fluid layer, which is substantially non-adhesive and which is capable of being imparted with an adhesiveness on application of an energy, forming a layer of the fluid ink on an ink carrying member, applying an energy pattern corresponding to a given image signal to the ink layer to form an adhesive pattern of the ink, and transferring the adhesive pattern of the ink to a transfer-receiving medium to form thereon an ink pattern corresponding to the energy pattern applied.

However, the above-mentioned recording method is not necessarily suitable for mass-produced printed matter, in view of the printing cost, etc.

On the other hand, as the technique suitable for mass-production printing, there are various printing processes known such as planograpic printing, letterpress printing, and gravure printing. However, in these conventional printing processes, the production of a printing plate requires complicated steps and the patterning of an ink requires dampening with water, which makes handling thereof considerably troublesome. Further, because the adhesion property of the ink is easily affected by temperature or humidity, the above-mentioned printing processes lack U environmental stability. Accordingly, it is difficult to apply the conventional printing processes to the peripheral recording equipment used in conjunction with a computer, etc.

Our research group has also proposed printing processes, including one using a solid ink (Japanese Patent Application No. 274250/1987 and No. 291821/1987 corresponding to U.S. patent application Ser. No. 270,070), and one wherein an ink is supplied to a printing plate by changing the pH value in the ink (Japanese Patent Application No. 325592/1987 corresponding to U.S. patent application Ser. No. 287,151.)

Our research group has also proposed a printing process wherein a voltage is applied to an ink so as to change its adhesiveness, whereby a recording is effected (U.S. patent application Ser. No. 301,146). Our research group has also proposed a printing process wherein any ink remaining in the device used therefor is easily removed (U.S. patent application Ser. No. 325,986).

The above-mentioned printing method which relies upon a change in the adhesiveness or adhesivity of an ink by application of a voltage still requires improvement. Namely, in this printing method, the properties of the ink are gradually changed, particularly when the printing is continued for a long time. For instance, electrical resistivity of the ink is gradually increased or the viscosity of the ink is increased, with the result that the adhesiveness of the ink cannot be controlled uniformly.

SUMMARY OF THE INVENTION

According to the present invention, there is provided an image forming method comprising the steps of:

(a) providing a recording composition capable of changing its adhesivity corresponding to the polarity of a voltage applied thereto between a pair of electrodes;

(b) applying a voltage between the pair of electrodes to attach the recording composition to one of said pair of electrodes; and (c) adding additional at least one component of said recording composition to said recording composition.

The present invention also provides an image forming method comprising the steps of:

(a) providing a recording composition capable of changing its adhesivity corresponding to the polarity of a voltage applied thereto between a pair of electrodes, at least one of said electrodes having a pattern comprising an electroconductive portion and an insulating portion;

(b) applying a voltage between the pair of electrodes to pattern-wise attach the recording composition to said electrode having said pattern; and (c) adding additional at least one component of said recording composition to said recording composition.

The present invention also provides an image forming apparatus, comprising:

a pair of electrodes at least one of which has a pattern comprising an electroconductive portion and an insulating portion;

means for supplying a recording composition between the pair of electrodes;

means for applying a voltage between the pair of electrodes; and ink component adding means for adding at least one component of the recording composition to the recording composition.

The present invention is aimed at providing an image forming method and apparatus capable of suppressing long term change of an ink during use so as to ensure that high quality of print image can be stably obtained.

DESCRIPTION OF THE PREFERRED EMBODIMENTS

The inventors made an intense study on the mechanism of degradation of transfer image due to a long term change of ink properties encountered with an image forming method using an ink in which its adhesivity varies according to voltage applied thereto. It was discovered that the degradation of the transfer image is attributable to the fact that water and other components of the ink are lost during printing due to evaporation or due to application of voltage. In particular, an ink with reduced water content exhibits a rise in its electrical resistivity, as well as in its viscosity, so as to cause a change in the transfer characteristic of the ink, resulting in a degradation of recording image quality.

The transfer characteristics of an ink composition are affected, inter alia, by the initial viscosity of the ink composition and by the ambient electrical characteristics of the ink composition. The electrical characteristics of the ink affect the ability of the ink to generate a gas during electrolysis to reduce adhesivity of the ink due to the presence of a gas. The electrical characteristics also affect the ability of chargeable fines in the ink to become charged upon application of voltage and to become attracted to a pole having an opposite charge. In addition, the electrical characteristics also affect the capacity of a cross-linked moiety in the ink to convert from a gas-like, relatively non-adhesive (cross-linked) state to a relatively adhesive, sol (non-crosslinked) state upon application of voltage.

The present invention is based upon this discovery.

In the image-forming method according to the present invention, there is utilized a transfer characteristic property of an ink such that when a voltage is applied thereto by means of a pair of electrodes, an ink having adhesiveness is caused to become non-adhesive to the electrode, or an ink having substantially no adhesiveness is caused to have adhesiveness to the electrode. In the present invention, based on such transfer characteristic property, an image is formed by using a printing plate as one of the above-mention-d pair of electrodes.

Figure 1:
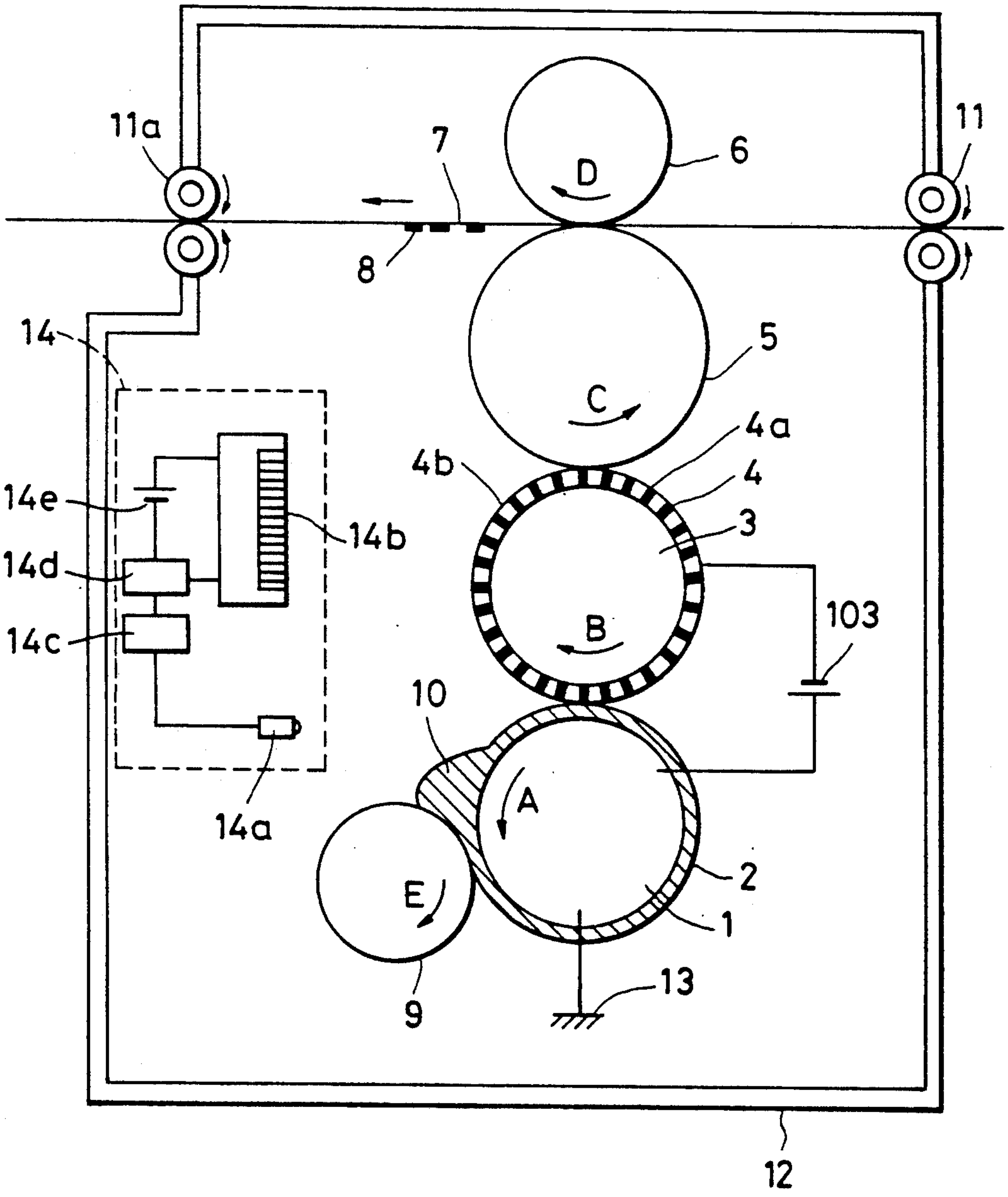
FIG. 1 is a side elevational view of an apparatus suitable for carrying out the image forming method of the present invention.

Referring to FIG. 1, an ink carrier roller 1 is a cylindrical member rotating in the arrow A direction. The roller 1 may preferably comprise an electroconductive material such as aluminum, copper and stainless steel. Onto the cylindrical ink carrier surface of the roller 1, an ink 2 as a recording material is supplied by means of a coating roller 9 rotating in the arrow E direction to be formed into a layer having a uniform thickness.

The cylindrical ink carrier surface of the roller 1 may be composed of any material, which makes it possible to form a desired layer of the ink 2 when the roller 1 is rotated in the arrow A direction. More specifically, the roller surface may preferably be composed of a conductive material such as a metal, including stainless steel. The ink carrier roller 1 is connected to one of the terminals of the DC power supply 103.

The roller surface composed of such a conductive material can be smooth, but may preferably be roughened to an appropriate extent (e.g , a roughness of the order of 1S according to JIS B 0601) so as to enhance the conveying and carrying characteristics.

In contact with the ink layer 2 disposed on the ink carrier roller 1, there is disposed a printing plate 4 wound about a plate roller 3. The printing plate 4 may, for example, comprise a substrate **4*a* comprising an electroconductive material such as metal, and a desired pattern 4*b* disposed thereon comprising an insulating material, as shown in FIG. 2**.

Figure 2:
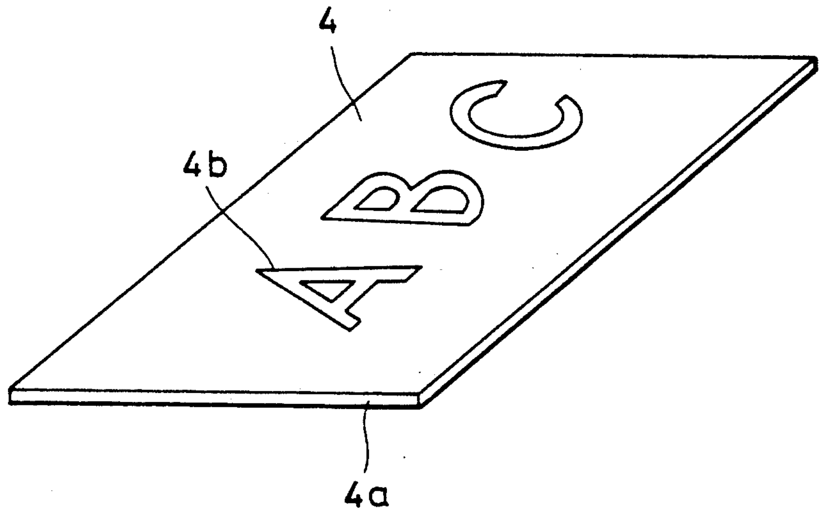
FIG. 2 is a perspective view of a printing plate used in an apparatus embodying the present invention.

Referring to FIG. 2, the material constituting substrate **4*a*** may include metals, such as aluminum, copper, stainless steel, platinum, gold, chromium, nickel, phosphor bronze, and carbon; electronconductive polymers, and dispersions obtained by dispersing a metal filler, etc., in various polymers.

The material constituting the pattern **4*b* may include: materials for thermal transfer recording, mainly comprising waxes or resins; electrophotographic toners and natural or synthetic polymers, such as a vinyl polymer. In a case where a solid recorded image (i.e., a recorded image which is entirely filled with an ink) is formed, a printing plate 4 without a pattern 4*b*** may be used.

Referring again to FIG. 1, when a voltage is applied between the printing plate 4 and the ink carrier roller 1 by means of the power supply 103, the adhesiveness of a portion of the ink 2 contacting the electroconductive portion of the printing plate 4 is changed, and the ink 2 is caused to selectively or patternwise adhere to the printing plate 3 corresponding to the resultant difference in the above-mentioned adhesiveness, to form an ink pattern thereon.

The voltage applied from the power supply 103 may practically be a DC voltage of 3–100 V, and more preferably, 5–80 V. When an AC bias voltage, preferably of 10–100 V in the form of a high frequency preferably of 10 Hz–100 kHz, is further applied, the image quality may be higher in sharpness.

Incidentally, while the printing plate 4 side is a cathode and the ink carrier roller 1 side is an anode in FIG. 1, the printing plate 4 side may also be an anode and the ink carrier roller 1 side may also be a cathode depending on the properly or state of an ink used in combination therewith.

In the present invention, it is preferred that the voltage from the power supply 103 is applied between the axes of rotation of the plate roller 3 and the ink carrier roller 1.

The thickness of the layer of the ink 2 formed on the ink carrier roller 1 can vary depending on various factors, including the gap between the ink carrier roller 1 and the coating roller 9, the fluidity or viscosity of the ink 2, the surface material and roughness thereof of the ink carrier roller 1, and the rotational speed of the roller 1. The thickness of the ink layer 2 may preferably be 0.001–100 mm, more preferably 0.001–10 mm as measured at an ink transfer position, where the roller 1 is disposed opposite to the pattern plate 4 on the plate roller 3.

If the layer thickness of the ink 2 is below 0.001 mm, it is more difficult to form a uniform ink layer on the ink carrier roller 1. On the other hand, if the ink layer thickness exceeds 100 mm, it becomes more difficult to convey the ink 2, while keeping a uniform peripheral speed of the surface portion on the side contacting the printing plate 4 having the electroconductive pattern. Further, it also becomes difficult to pass a current between the pattern plate 4 and the ink carrier roller 1.

The thus formed ink pattern on the printing plate 4 is then transferred to a blanket cylinder 5, as an intermediate transfer medium, which rotates in the arrow C direction while contacting the printing plate 4 under pressure. Further, the ink pattern disposed on the blanket cylinder 5 is transferred to a recording medium (or a medium to be recorded) 7 such as a sheet of paper, cloth or metal, passing between the blanket cylinder 5 and an impression cylinder 6, as a pressure-applying means. The impression cylinder 6 rotates in the arrow D direction while contacting the blanket cylinder 5, whereby an image 8 corresponding to the above-mentioned ink pattern is formed on the recording medium 7.

It is also possible for the ink pattern formed on the printing plate 4 to be directly transferred to the recording medium 7 in same cases without providing the blanket cylinder 5 as an intermediate transfer medium. However, when the blanket cylinder 5 is provided, the printing plate 4 better resists wearing or deteriorating on the basis of the material constituting the blanket cylinder 5. The materials constituting the outer surface of blanket cylinder 5 may include, for example, silicone rubber. Accordingly, an image 8 having the same pattern as that of the printing plate 4 may be obtained on the recording medium.

An ink component supplying means 14 is provided in a housing 12 and is capable of adding to the ink at least one component of the recording composition, including water and other components of the ink so as to maintain the sensitivity of the ink to the voltage applied.

Although the following description of the ink component adding means 14 specifically mentions water as the component to be added, it is to be understood that the ink component adding means may be arranged to add a component or components other than water.

FIG. 1 shows an example of the ink component adding means 14. The ink component adding means shown in FIG. 1 has a humidity sensor 14*a* which is disposed in the vicinity of an ink pool 10 so as to sense humidity of air in the recording apparatus, particularly n the portion near the ink 2. The ink component adding means 14 also has, for example, a supersonic humidifier 14*b* which is controlled and driven by a control unit 14*c* and a driver 14*d* in accordance with the data derived from the humidity sensor 14*a*. Numeral 14*e* denotes a power supply for driving the humidifier 14*b*. The humidifier may be of the type which employs a heater for heating and evaporating water and a blower for bringing the vapor into contact with the ink 2.

The control unit 14*c* stores humidity data concerning humidity around the ink 2 to enable formation of an optimum image. The humidity sensed by the humidity sensor 14*a* is compared with the data stored in the control unit 14*c*. Then, the control unit 14*c* cooperates the driver 14*d* and, hence, the humidifier 14*b*, when the sensed humidity is below the humidity level of the set data. Humidifier 14*b* replaces water lost by ink 2.

As will be described in detail, three types (1), (2) and (3) of mechanisms or modes are available for causing a change in the adhesiveness of ink by voltage application. The preferred water content of the ink suitable for use in the present invention are 20 to 95%, 20 to 80% and 15 to 95%, respectively, for the types (1), (2) and (3). However, the ink water content is progressively reduced as time elapses during printing by an amount of 30 to 80% until the ink is transferred to one of the electrodes, thus impairing the adhesiveness of the ink.

The correlation between the change in the water content of the ink and the change in the adhesiveness of the ink varies according to the kind of the ink employed, so that the allowable range of fluctuation in the water content varies depending on the ink selected. It is, however, necessary that the water content be maintained at a level which enables the amount of any electro-chemical change and the amount of change in the physical properties, such as viscosity, to be controlled within predetermined ranges, regardless of the type of ink used. That is because an undue reduction in the water content of the ink makes the adhesiveness uncontrollable, while an unduly large increase in the water content excessively reduces the viscosity of the ink, making it difficult to control its adhesiveness. Therefore, according to the invention, the preferable range over which the water content of the ink is variable is determined to be from −35 to +35% for type (1), from −40 to +40% for type (2) and from −25 to +25% for type (3), using the water content of the ink immediately after preparation as the reference or basis. Thus, the addition of water by the humidifier 14*b* should be conducted to compensate for the water lost and to preferably maintain the water content within the above-specified range for each case.

In order to enhance the operation of the ink component adding means 14, it is preferred to isolate at least the ink and the ink component adding means 14 from the ambient air by the housing 12. The recording medium 7 is introduced into the housing 12 through a first sealing means 11 and then moved out of the housing 12 through a second sealing means 11*a*. The sealing means 11 and 11*a* are preferably constructed to seal the interior of the housing 12 from the ambient air while allowing the recording medium to pass therethrough. In the embodiment shown in FIG. 1, a pair of opposing rollers are used as such sealing means. The recording medium is moved through the nip between these rollers. The housing 12 can have a suitable form such as a box form, vessel-like form or a sack-like form and may be made of a metallic or a plastic material.

Figure 3:
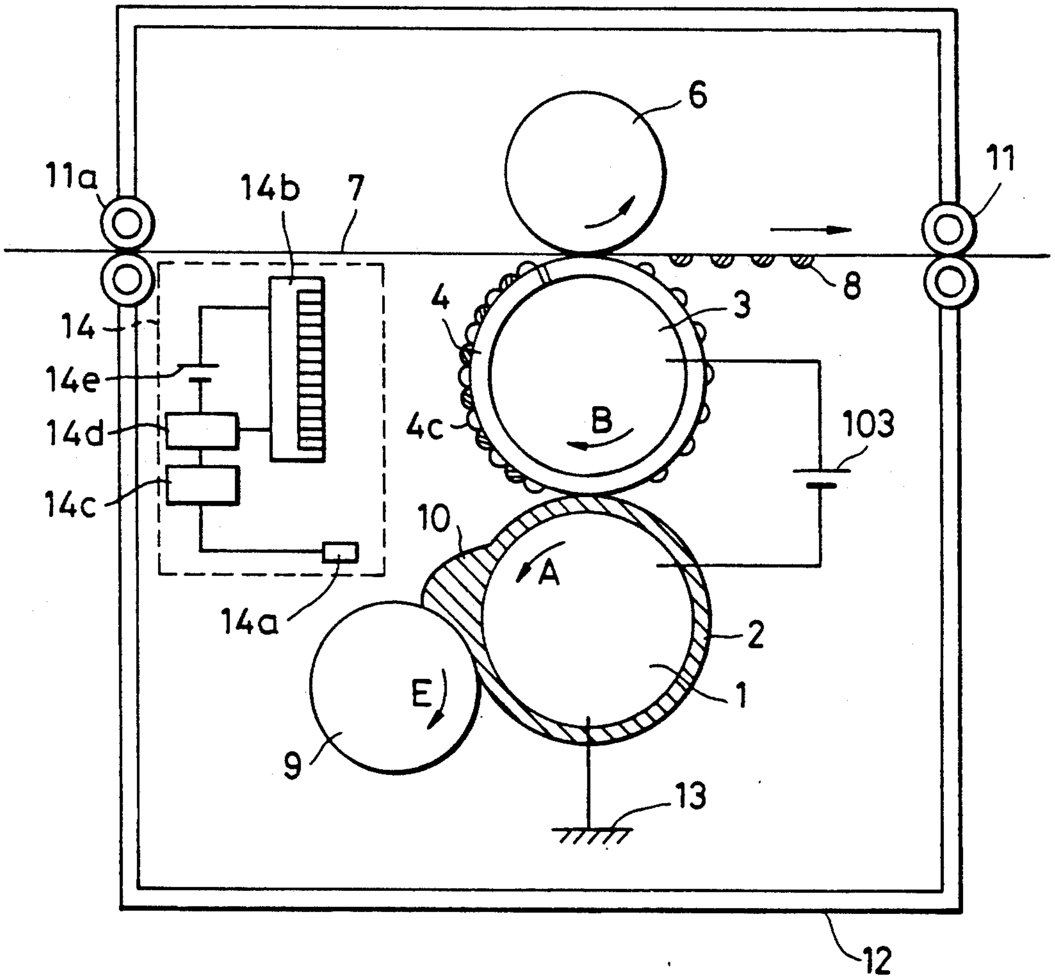
FIGS. 3 and 4 are side elevational views of another embodiment of the image forming method of the present invention.

FIG. 3 shows another embodiment of the present invention. In the embodiment as shown in FIG. 3, the printing plate 4 comprises a printed substrate comprising a metal plate and a pattern of an insulating photoresist 4*c* disposed thereon. In such embodiment, an ink adheres to a portion of the metal plate without the photoresist, and the ink selectively attached to the printing plate 4 in this manner is then transferred to a recording paper 7 thereby forming a recorded image 8 thereon. When an ink initially having a suitable adhesiveness is used, the ink adheres to a portion of the photoresist to form an ink pattern.

Figure 4:
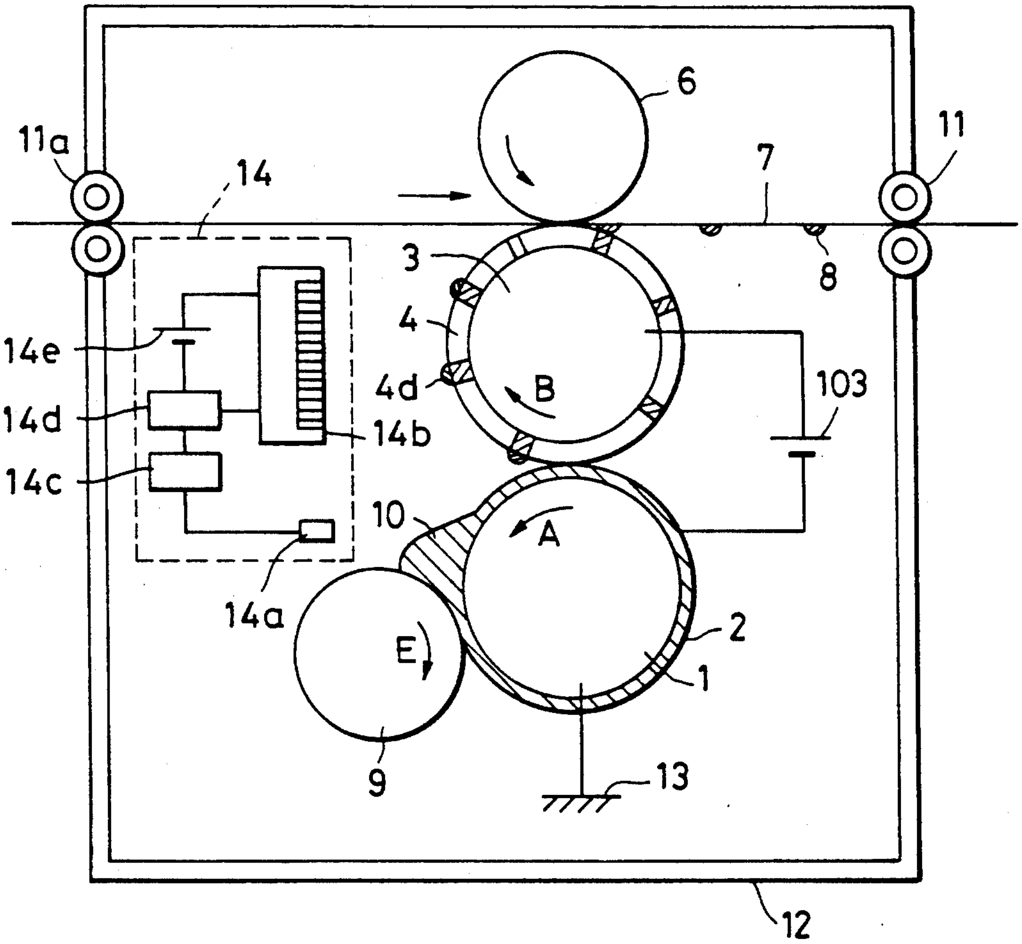

FIG. 4 shows another embodiment of the present invention. In this embodiment, the printing plate 4 comprises an electroconductive substrate and a photoconductor (or photoconductive material) disposed thereon. More specifically, in such a printing plate 4, the photoconductor is patternwise irradiated with light to form a portion 4*d* having persistent conductivity.

Preferred examples of such photoconductor include: gelatin-silver halide, a sheet coated with zinc oxide, selenium, amorphous silicon, organic photoconductors, etc. Incidentally, the persistent conductivity of a photoconductor is specifically explained in the Chapter IV of "Electrophotography" (1965) written by R. M Schaffert (published by Focal Press Limited).

In addition, the printing plate can be one comprising an electroconductive substrate and an insulating film disposed thereon wherein a conductivity pattern has been formed by electrical discharge destruction. The printing plate can also be one comprising an electroconductive substrate and a photographic image disposed thereon having a conductive pattern of silver obtained by deposition of silver particles.

In the embodiments as shown in FIGS. 1, 3 and 4, the printing plate 4 is wound around the cylindrical plate roller 3. It is also possible that the printing plate 4 be in the form of a flat plate, for use as an electrode. The ink applied onto the printing plate 4 is sandwiched between the plate 4 and an opposite electrode, and a voltage is applied to the ink in that state, whereby an ink pattern is formed on the printing plate 4.

The embodiment shown in FIGS. 3 and 4 also can prevent long term change in the transfer characteristic the ink, by incorporating the ink component adding means as shown in FIG. 1.

Figure 5:
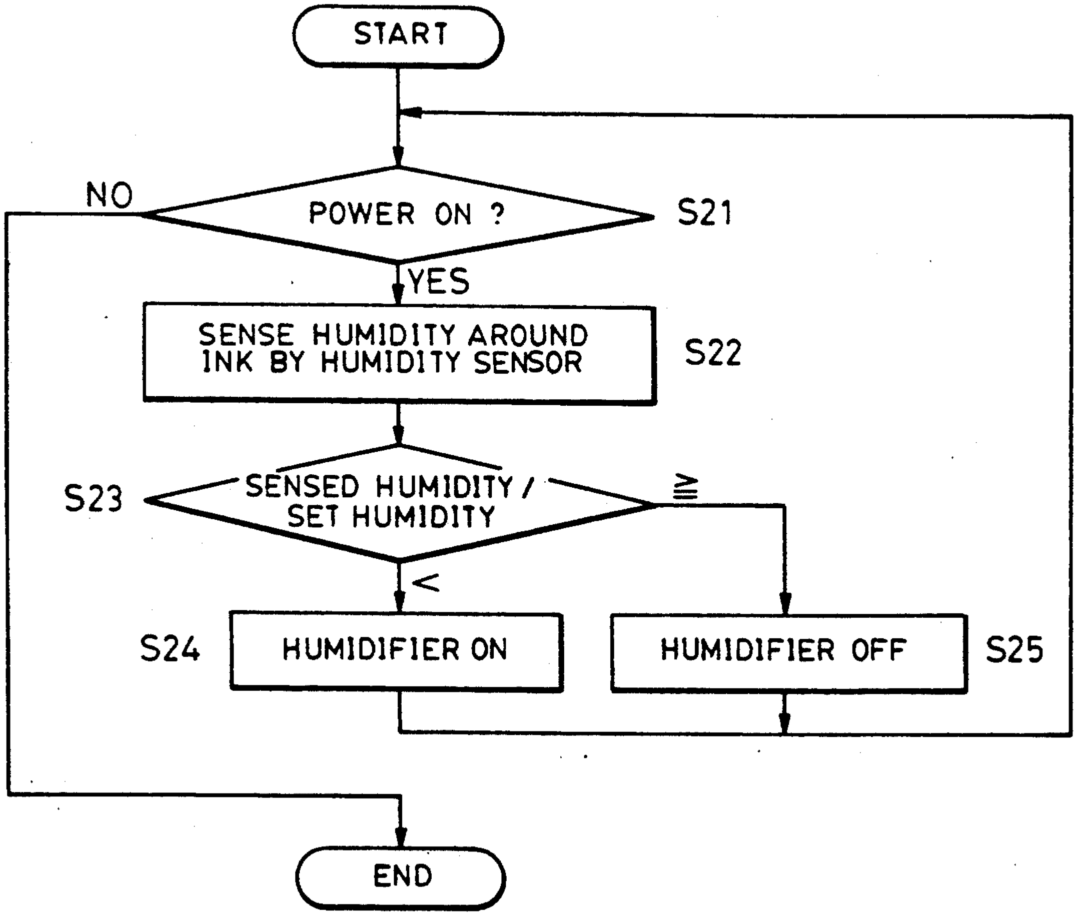
FIG. 5 is a flow chart showing a method of controlling a humidifying means.

The humidifying operation for maintaining the water content of the ink 2 by the ink component adding means will be described with reference to flow chart of FIG. 5. As the power supply of the recording apparatus is turned on, the humidity sensor 14*a* starts to sense the humidity of air around the ink 2 and delivers the sensing result to the control unit 14*c*, which compares the sensed data with a reference value of water content stored beforehand in the control unit 14*c*. These operations are executed in Steps S 21 to S 23.

When the humidity of air around the ink sensed by the humidity sensor 14*a* is below the reference value, the control unit 14*c* operates to drive the humidifier 14*b* so as to moisten the interior of the recording apparatus, in Step S 24. Conversely, when the humidity around the ink is high, the humidity sensor 14*a* continues to monitor the humidity without causing the humidifier 14*b* to operate. This operation is continued insofar as the power supply is operated.

Figure 6:
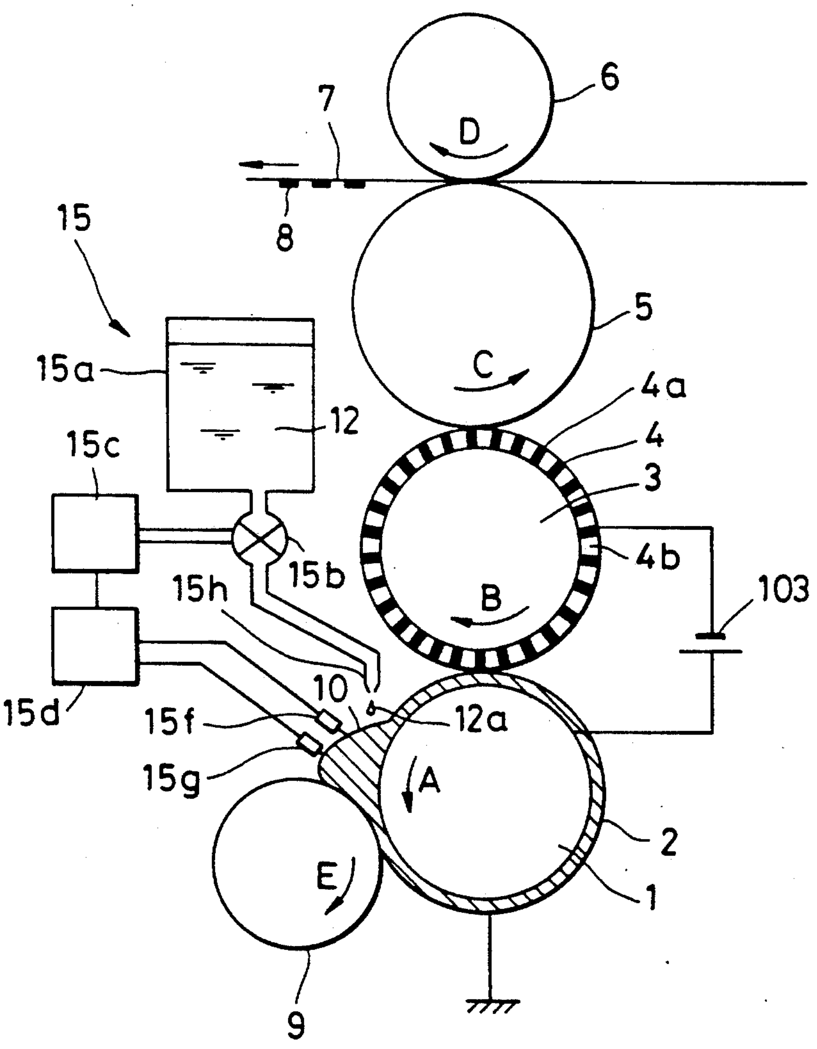
FIGS. 6 to 8 are side elevational views of different apparatus which are suitably used in carrying out the image forming method of the invention.

A device shown in FIG. 6 is capable of dripping an ink component into the ink pool 10 through an orifice 15*h* so as to compensate for any loss of the component thereby maintaining a constant content of this component. The ink component adding means 15 shown in FIG. 6 includes an ink tank 15*a* for storing an ink, a valve 15*b*, a control unit 15*c*, a sensor unit 15*d*, electrodes 15*f*, 15*g*, and an orifice 15*h*.

The operation of the ink component adding means 15 shown in FIG. 6 is as follows.

The electrodes 15*f* and 15*g* are inserted into the ink in the ink pool 10 so as t1 enable the sensor unit 15*d* to measure the electrical resistivity or conductivity of the ink, or the current value. When the measured value has substantially deviated from a predetermined level, the control unit 15*c* opens the valve 15*b* so that an ink component 12 is supplied in the form of small droplet 12*a* from the tank 15*a* through the orifice 15*b*. The droplet 12*a* of the ink component is uniformly stirred in the ink 2 by the rotation of an ink carrier roll 1 and a coating roll 9. When the value measured by the sensor unit 15*d* has reached the same level as the predetermined level the control unit 15*c* operates to close the valve 15*b*, thus stopping the supply of the ink component. This operation is repeated so as to maintain a constant value of the content of this component, thus offering enhanced stability of the printed image quality.

The above-described operation of the valve 15*b* may be conducted automatically or the valve 15*b* may be operated manually by an operator who reads the humidity value sensed by the sensor unit 15*d*. Uniformity of dispersion of the ink component can be enhanced by using a plurality of orifices 15*h* rather than a single orifice. It is also preferred that the orifice 15*b* is designed to atomize the ink in the form of a mist so as to promote the dispersion of the ink component. It is also possible to immerse the end of the orifice 15*b* in the ink within the ink pool 10. The addition of a predetermined quantity of an ink component to the ink 2 is conducted after the preparation of the ink and before the transfer of the ink to one of the electrodes caused by application of voltage. The timing of addition is preferably selected such that the ink has a constant content of the component when the ink is transferred to one of the electrodes. It is rather difficult to uniformly disperse the ink when the addition of components to the ink is conducted immediately before the transfer of the ink.

More specifically, referring to FIG. 6, it is preferred that the compensation for the loss of the ink component is conducted by adding the ink component to the ink pool 10 which is formed when the ink is supplied into the nip between the coating roll 9 and the ink carrier roll 1. The water content of the ink may be measured directly by any known method. However, since the measurement of water content is rather time consuming, it is difficult to adequately control the water content continuously during execution of the printing process, particularly when the change in the water content takes place rapidly. Instead of direct measurement of the water content of the ink, therefore, it is effective to measure the water content indirectly through sensing a factor which is related to the water content, such as electrical resistivity, electrical conductivity or a change in the current value which takes place when a voltage is applied to the ink. Based on the sensed factor the quantity of water to be added is set. Accordingly, the water content can be continuously and easily controlled during the printing process. Furthermore, the water content can be measured when the measurement is conducted on the basis of data obtained by combining the measured values of all these three factors.

Electrical resistivity and the electrical conductivity can be measured by ordinary methods. Namely, it is possible to instantaneously measure these two factors using a pair of electrodes immersed in the ink to be measured. FIG. 6 shows a manner in which the water content of the ink in the ink pool 10 is measured by means of a pair of electrodes 15*f* and 15*g*. Thus, the measurement is preferably conducted at the ink pool, partly because the pool holds the ink in an amount large enough to enable measurement and partly because the state of dispersion of the ink by addition of water is well represented by the ink in the pool. The measurement, however, may be conducted on the ink carried by the ink carrier roll 1.

The measurement of the electrical current may be conducted in the same was as the measurement of the electrical resistivity and conductivity. Alternatively, the current may be directly read from an ammeter by applying a voltage supplied by a power supply 103.

By the above-described method which senses the change in the content of the ink component through measurement of three factors, it is possible to continuously compensate for any loss of the ink component by adding such a component so as to recover the initially measured values.

The range to which the electrical resistivity is to be controlled varies depending on the kind of the ink used. In general, however, the electrical resistivity is preferably controlled to range between −70 and +200% for the type (1), −50 and + −200% for the type (2) and −50 and +150% for the type (3), so that the component is added to make the resistivity fall within the above-mentioned range. The control of addition of the component in accordance with the measured value of the conductivity and current value may be accomplished in the same manner as that described above in connection with the control conducted on the basis of the measured value of the electrical resistivity.

Figure 7:
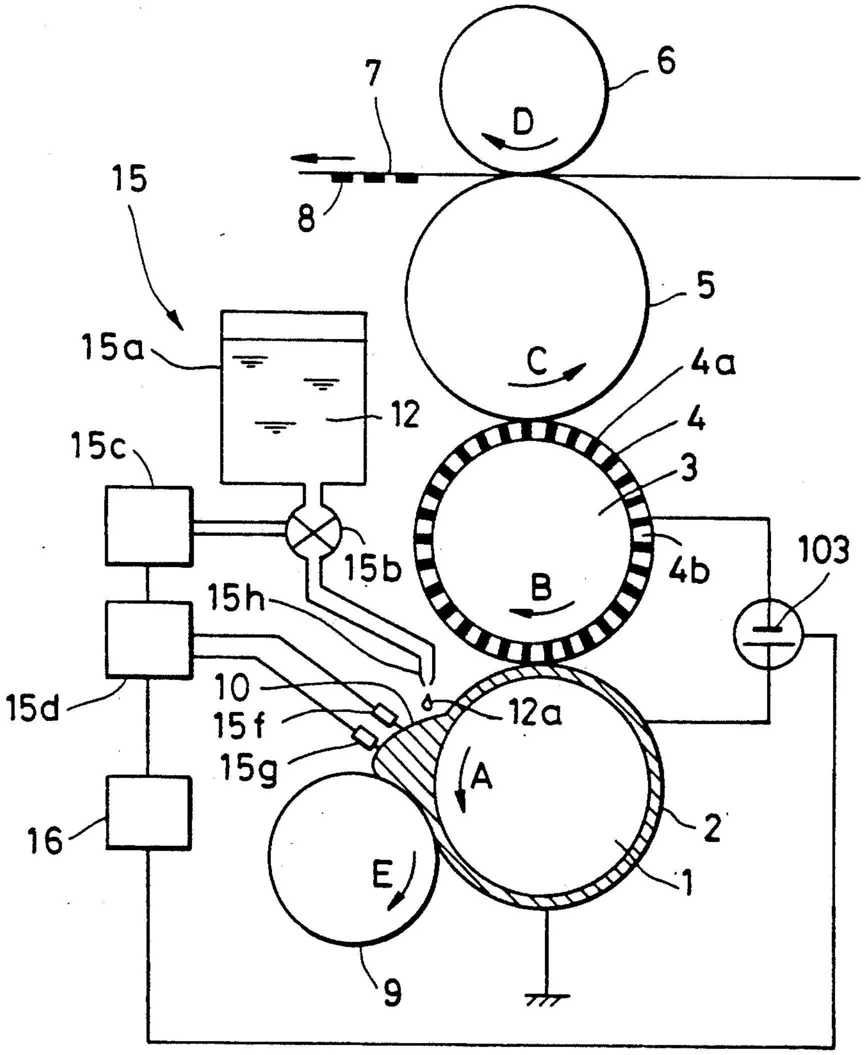

The device shown in FIGS. 1, 3, 4 and 6 ma have means for controlling the voltage of the power supply 103 in accordance with a change in the value of the electrical resistivity. FIG. 7 shows a device which is substantially the same as that shown in FIG. 6, but provided with a voltage control means of the type mentioned above.

When the electrical resistivity in the ink 2 has risen during continuous use of the device shown in FIG. 7 due to, for example, reduction of water content caused by evaporation, a sensor unit 15*d* senses the reduction in the electrical resistivity and delivers a signal to a voltage control unit 16 which then operates to lower the voltage imposed by the power supply 103. Conversely, when the electrical resistivity of the ink 2 is reduced during continuous operation of the device of FIG. 7 in an atmosphere of a high humidity, e.g., 90% or higher in terms of relative humidity, the reduced electrical resistivity is sensed by the sensor unit 15*d* so that the voltage control unit 16 operates to lower the voltage of the power supply 103.

Thus, the adhesiveness of the ink can stably be controlled by maintaining a constant level of electrical current in the ink by varying the voltage applied to the ink in response to a change in the electrical resistivity.

It is not always necessary to employ the pair of electrodes 15*f* and 15*g* in measuring the electrical resistivity of the ink 2. It is possible to measure the electrical resistivity of the ink by measuring the electrical current which flows between the ink carrier roll 1 and the plate roll 3 across the ink 2.

The devices shown in FIGS. 1, 3, 4, 6 and 7 employ a cylindrical roll as the ink carrier roll 1. The ink carrier roll, however, may be substituted by a suitable ink carrier member such as a belt or a sheet-like member. Such a belt or sheet-like member maybe fed unidirectionally from a supplying end to a take-up end, although the member is preferably formed as an endless member to permit repeated use.

Figure 8:
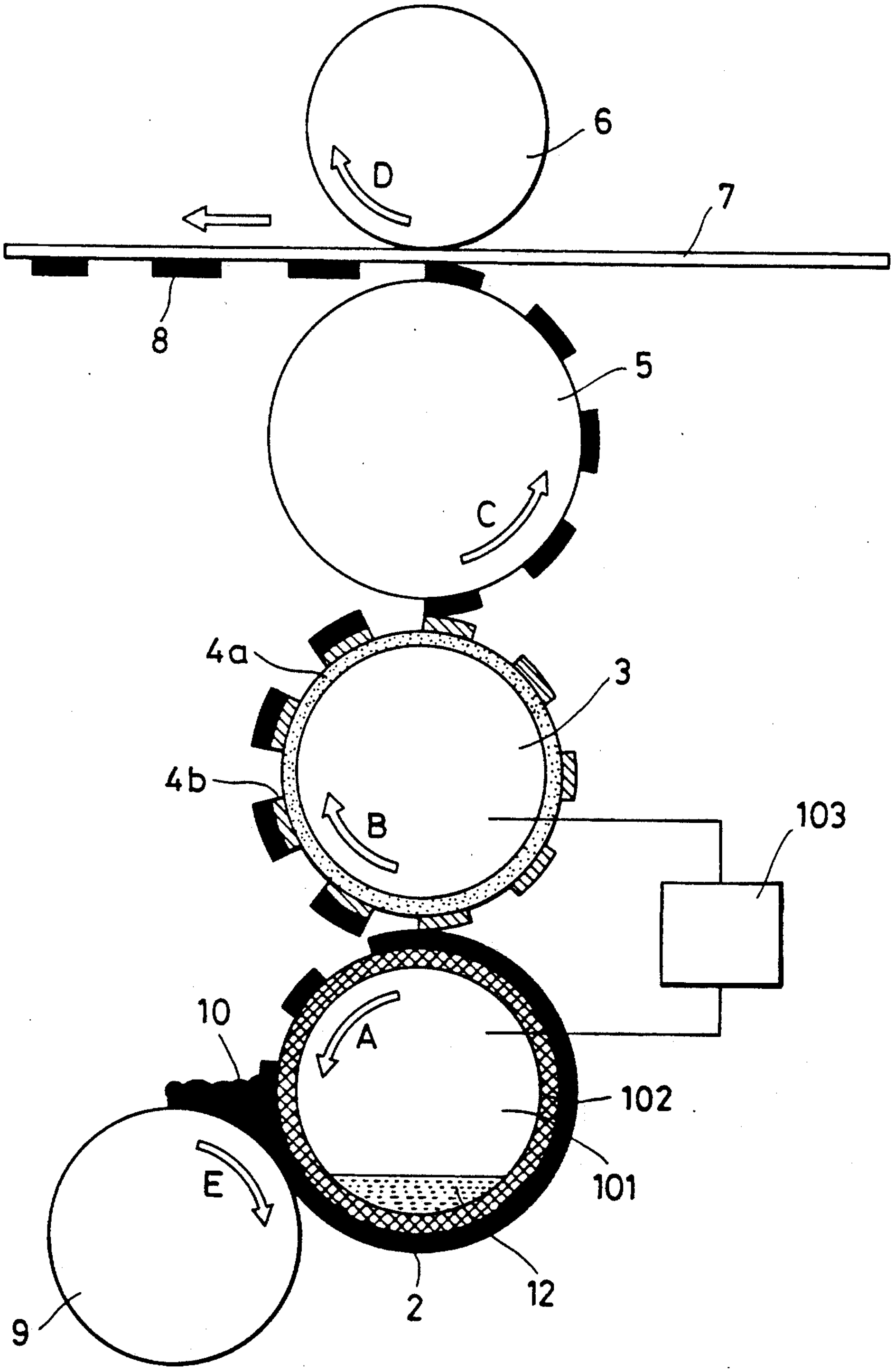

It is also possible to use, as the ink component adding means, a vessel or ink roll 101 made of a porous material as shown in FIG. 8. The vessel 101 has a form substantially the same as that of the ink carrier roll 1 used in the devices shown in FIGS. 1, 3, 4, 6 and 7 and is made of a hollow porous material for accommodating an ink component such as water. The ink carrier roll 101, therefore, may be a hollow cylindrical member having a peripheral wall made of a porous sintered metal or a cast metal which are ordinarily used in, for example, oil-less bearings. The roll 101 is closed at its both ends by end plates (not shown) so that it can contain an ink component such as water. The ink component can be supplied from the outside of the roll 101 through a hollow shaft which is not shown.

In order to improve the durability of the surface of the roll 101 which serves as an electrode, the surface may be plated with, for example, platinum.

It is also possible to apply a suitable level of pressure to the interior of the roll 101 so as to promote exudation of the ink component to the surface of the roll 101.

The porous peripheral wall 102 of the roll 101 should have a porosity suitable for supplying the ink component at a required rate to the surface of the roll 101. The porosity is determined in accordance with various factors such as the ink composition, rate of evaporation of the ink component, rate of loss of the ink component caused by application of the voltage, and so forth.

The porosity of the peripheral wall 102 of the roll 101 used in the invention, for example, preferably ranges between 30 and 40%. A smaller value of porosity is usable when the roll 101 is designed to enable application of a suitable level of internal pressure.

In the arrangement shown in FIG. 8, the surface of the roller 101 is increased due to porous nature of the roll wall 102, so that an increased affinity is exhibited between the ink and the ink carrier roll 101, so that a superior image quality with reduced fogging can be obtained. The detecting means for measuring change in physical properties of the recording composition may be omitted from the apparatuses shown in FIGS. 1, 3, 4 and 6 to 8, if the quantity of loss of component of the recording composition is known from experience.

As described hereinabove, in the image-forming method according to the present invention, a specific ink is supplied to a portion between an electrode (printing plate) having a desired pattern and an opposite electrode. Thereafter, a DC voltage is applied between the above-mentioned pair of electrodes, to change the adhesiveness of the ink corresponding to the pattern of the above-mentioned electrode.

Accordingly, the image-forming method according to the present invention may be classified into the following two modes depending on the property of an ink used therein.

(I) A mode wherein the ink has inherent adhesivity under no voltage application, and the ink loses such adhesiveness when a voltage is applied thereto. In such a mode, the ink adheres to the insulating portion of a printing plate to form a desired ink pattern, which in pattern is then transferred to a transfer-receiving medium, such as a recording medium or an intermediate transfer medium, to form thereon a desired image.

(II) A mode wherein the ink has substantially no inherent adhesiveness under no voltage application, the ink exhibits an adhesiveness when a voltage is applied thereto. In such a mode, the ink adheres to the electroconductive portion of a printing plate to form a desired ink pattern, which is then transferred to a recording medium, etc. to form thereon a recorded image.

Hereinbelow, there will be described inks to be used in the image-forming method according to the present invention.

Whether the ink is initially caused to be adhesive or not as described in the above-mentioned mode (I) or (II) may easily be controlled by regulating the proportion of materials constituting the ink, or the kinds of these materials.

On the other hand, there may be utilized the embodiments (1)-(3) which follow, wherein an adhesive ink is converted to a non-adhesive state or a non-adhesive ink is converted to an adhesive state under the application of a voltage.

(1) In a first embodiment an ink is subjected to electrolysis to generate a gas on the basis of electric conduction due to voltage application, whereby the adhesiveness of the ink is changed.

In such an embodiment an ink is prepared so that it initially has an adhesiveness, and the ink is caused to generate a gas in the neighborhood of one electrode under voltage application, whereby the ink becomes non-adhesive to the electrode due to the formation of such gas.

In order to cause the ink to generate a gas due to electrolysis, a solvent such as water, alcohol and glycol or a solvent containing an electrolyte such as sodium chloride and potassium chloride dissolved therein, is present in the ink. The electric resistance of the ink is preferably as low as possible. More specifically, the volume resistivity of the ink may preferably be $10^9$ ohm.cm or below, more preferably $10^4$ ohm.cm or below and, most preferably, $10^2$ ohm.cm or below. If the volume resistivity exceeds $10^9$ ohm.cm, the amount of electric conduction is too low, or a high voltage is required in order to prevent a decrease in the amount of electric conduction.

For example, the generation of a gas in an hydroxyl group (—OH)-containing solvent based on electrolysis due to electric conduction, or the generation of a gas in water based on electrolysis due to electric conduction may be considered as follows:

On the cathode side:

$$2ROH^{+}+2e^{-}\rightarrow H_2\uparrow+2RO^{-}$$

(One mole of hydrogen gas is generated)

(In the case of water):

$$2H^{+}+2e^{-}\rightarrow H_2\uparrow$$

(One mole of hydrogen gas is generated)

On the anode side:

$$2ROH\rightarrow 2RCHO+2H^{+}+2e^{-}$$

(In the case of water):

$$2OH^{-}\rightarrow H_2O+1/2O_2\uparrow+2e^{-}$$

($\frac{1}{2}$ mole of oxygen gas is generated)

As shown in the above formulas, the amount of generated gas is proportional to the amount of electrons ($e^-$), i.e., the magnitude of the electric current. The gas is generated only on the cathode side (in the case of the hydroxyl group-containing solvent other than water), or the gas is generated on the cathode side in an amount which is twice that of the gas generated on the anode side. In other words, when the difference in the amount of the generated gas is greater than a certain value, the ink becomes non-adhesive to the electrode at which the larger amount of gas is generated, (e.g., cathode in the case expressed by the above-mentioned formulas).

(2) In a second embodiment the adhesiveness of an ink is changed on the basis of Coulomb force under voltage application.

In such an embodiment, an ink comprising inorganic or organic fine particles and a liquid dispersion medium is used, and a difference in chargeability of the fine particles is utilized to change the adhesivity of the ink.

More specifically, in a case where an ink is prepared so that it initially has an adhesiveness and contains negatively chargeable fine particles (i.e.; those capable of being easily charged negatively) the ink on the cathode side becomes non-adhesive to the cathode when a voltage is applied to the ink. In a case where an ink is prepared so that it initially has an adhesiveness and contains positively chargeable fine particles (i.e., those capable of being easily charged positively), the ink on the anode side becomes non-adhesive to the anode when a voltage is applied to the ink.

Alternatively, an ink is prepared so that it is initially non-adhesive and contains negatively chargeable fine particles, the ink on the anode side becomes adherent to the anode under voltage application. In a case where an ink is prepared so that it is initially non-adhesive and positively chargeable fine particles are contained therein, the ink on the cathode side becomes adherent to the cathode under voltage application.

(3) In a third embodiment a crosslinked structure of an ink or the dissociative state of an electrolyte contained therein is changed by an electrochemical reaction included by electric conduction due to voltage application, whereby the adhesiveness of the ink is changed.

In such an embodiment, the ink may be prepared so that it is initially non-adhesive or initially has adhesiveness. When the ink is prepared so that it initially has substantially no adhesiveness, on voltage application at least a part of the crosslinked structure is changed or destroyed, and the ink is converted from a gel-like state to a sol-like state, whereby the ink is imparted with adhesivity. Alteratively, the dissociative state of the electrolyte contained in the ink is changed, upon application of voltage whereby the ink is imparted with adhesiveness.

When the ink is prepared so that it initially has adhesiveness, the adhesive ink becomes non-adhesive by the opposite reaction to that as mentioned above.

It is considered that the mode of the image-forming method according to the present invention is any one of the above-mentioned three types (1), (2), and (3). It is possible that the type of the image-forming method is a combination of two or more of the above-mentioned three types.

Incidentally, when an ink is used which is converted from an adhesive state to a non-adhesive state under voltage application, then with respect to the portion of an ink layer not supplied with a voltage, almost the entire ink layer along the thickness direction is transferred to a printing plate (hereinafter such transfer of an ink is referred to as "bulk transfer"). On the other hand, in the case of an ink which is converted from a non-adhesive state to an adhesive state, it is believed that the above-mentioned bulk transfer or partial transfer occurs wherein a portion of the surface layer of the ink is transferred, depending on the relationship among adhesion forces at the respective interfaces and the cohesive force in the ink.

The ink used in the present invention may be one having an adhesiveness or one having substantially no adhesiveness under no voltage application. However, the ink capable of causing bulk transfer is preferred, in view of image density, because such ink may readily provide a uniform image density.

If the ink used in the present invention is a liquid dispersion medium having a low viscosity, such as water and alcohol, the cohesive force of the ink is weak, whereby it is difficult to obtain a suitable adhesiveness.

More specifically, the ink used in the present invention may preferably satisfy at least one of the following properties.

(1) Adhesiveness

A sample ink (reflection density: 1.0 or larger) is caused to adhere to a stainless steel plate of 1 cm×1 cm in size coated with platinum plating which is vertically disposed, so that a 2 mm-thick ink layer is formed on the stainless steel plate. The sample is left standing as is for 5 seconds. in an environment of a temperature of 25° C.

and a relative humidity of 60%. Then the height of the ink layer is measured. Through the measurement, the ink used in the present invention is preferably substantially held on the stainless steel plate. More specifically, the above-mentioned height of the ink layer is preferably 50% or more, more preferably 80% or more, based on the original height thereof.

(2) Adhesiveness under no voltage application

A 2 mm-thick layer of a sample ink is sandwiched between two stainless steel plates, each of 1 cm×1 cm in size, coated with platinum plating, which plates are vertically disposed. The stainless steel plates are separated from each other at a peeling speed of 5 cm/sec without voltage application. Then, the areas of both plates covered with the ink are respectively measured. During the measurement, in the ink used in the present invention, the respective plates preferably show substantially the same adhesion amount of the ink. More specifically, each plate preferably shows an area proportion of 0.7–1.0, based on the ratio of the area measured above to the area of the plate which was originally been covered with the above-mentioned 2 mm-thick ink layer.

(3) Adhesiveness under voltage application

A sample ink (reflection density: 1.0 or larger) is applied to a stainless steel plate of 1 cm×1 cm coated with platinum plating to form an ink layer about 2 mm-thick. Another stainless steel plate coated with platinum plating having the same size as described above is, after the reflection density thereof is measured, disposed on the ink layer, and the two stainless steel plates are vertically disposed. The a voltage of +30 V is applied between the above-mentioned two stainless steel plates sandwiching the 2 mm-thick ink layer, while one of the stainless steel plate is used as a cathode (ground) and the other is used as an anode. The stainless steel plates are separated from each other at a peeling speed of 5 cm/sec in an environment of a temperature of 25° C. and a moisture of 60%, while applying voltage in the above-mentioned manner. Then, reflection density of each stainless steel plate surface is measured to determine the increase in reflection density of the stainless steel plate. During the measurement, for the ink used in the present invention, it is preferred that the coloring content of the ink is not substantially transferred to one of the above-mentioned two electrodes, and that the ink selectively adheres to the other electrode. More specifically, with respect to the electrode to which substantially no ink adheres, the increase in the reflection density is preferably 0.3 or smaller, more preferably 0.1 or smaller, when the above-mentioned ink per se has a reflection density of 1.0 or larger.

In a case where the adhesiveness of the ink is changed by the generation of a gas due to electrolysis, the liquid dispersion medium preferably includes; water, an alcohol, especially a lower alkanol such as methanol and ethanol, a solvent having a hydroxyl group, especially a polyhydric alkanol such as glycerine ethylene glycol and propylene glycol, or a solvent wherein an electrolyte such as sodium chloride and potassium chloride is dissolved. The content of the liquid dispersion medium may preferably be 40–95 parts by weight, more preferably 60–80 parts by weight, per 100 parts by weight of the ink. Unless otherwise indicated all parts are in parts by weight.

Particularly, water or an aqueous solvent may preferably be used as the liquid dispersion medium, because hydrogen is generated at the cathode side. When water and another liquid dispersion medium are mixed, the water content may preferably be 1 part or more, and more preferably 5–99 parts, per 100 parts of the ink.

The ink used in the present invention in which adhesiveness is changed by the above-mentioned type (2) basically comprises inorganic or organic fine particles and a liquid dispersion medium. The fine particles contained in the ink improve the cutting of the ink and enhance the image resolution provided thereby. The ink material used in the present invention is an amorphous solid in the form of a colloid sol and is a non-Newtonian fluid with respect to its fluidity.

When the ink adhesiveness is changed due to Coulomb force, charged or chargeable fine particles may be used entirety or as a part of the above-mentioned fine particles and are mixed or kneaded in a liquid dispersion medium as described hereinafter, e.g., by means of a homogenizer, a colloid mill or an ultrasonic dispersing means, whereby charged particles are obtained.

The "charged particle" used herein refers to a particle which has a charge prior to the kneading. The "chargeable particle" refers to a particle which can easily be charged by triboelectrification.

Examples of the particles to be supplied with a positive charge include: particles of a metal such as Au, Ag and Cu; particles of a sulfide such as zinc sulfide (ZnS), antimony sulfide ($Sb_2S_3$), potassium sulfide ($K_2S$), calcium sulfide (CaS), germanium sulfide (GeS), cobalt sulfide (CoS), tin sulfide (SnS), iron sulfide (FeS), copper sulfide ($Cu_2S$), manganese sulfide (MnS), and molybdenum sulfide ($Mo_2S_3$); particles of a silicic acid or salt thereof such as orthosilicic acid ($H_4SiO_4$), metasilicic acid ($H_2Si_2O_5$), mesortisilicic acid ($H_4Si_3O_3$), mesotetrasilicic acid ($H_6Si_4O_{11}$); polyamide resin particles; polyamide-imide resin particles; etc.

Examples of the particles to be supplied with a negative charge include: iron hydroxide particles, aluminum hydroxide particles, fluorinated mica particles, polyethylene particles, montmorillonite particles, fluorine-containing resin particles, etc.

Further, polymer particles containing various charge-controlling agents used as electrophotographic toners (positively chargeable or negatively chargeable) may be used for such purposes.

The above-mentioned fine particles generally have an average particle size of 100 microns or smaller, preferably 0.1–20 microns, and more preferably 0.1–10 microns. The fine particles may generally be contained ink in an amount of 1 wt. part or more, preferably 3–90 parts, and more preferably 5–60 parts, per 100 parts of the ink.

Examples of the liquid dispersion medium for use in the ink together with the above-mentioned fine particles include: ethylene glycol, propylene glycol, diethylene glycol, triethylene glycol, tetraethylene glycol, polyethylene glycol (weight-average molecular weight: about 100–1,000), ethylene glycol monomethyl ether, ethylene glycol monoethyl ether, ethylene glycol monobutyl ether, methyl carbitol, ethyl carbitol, butyl carbitol, ethyl carbitol acetate, diethyl carbitol, triethylene glycol monomethyl ether, triethylene glycol monoethyl ether, propylene glycol monomethyl ether, glycerine, triethanolamine, formamide, dimethylformamide, dimethylsulfoxide N-methyl-2-pyrrolidone, 1,3-dimethylimidazolidinone, N-methylacetamide, ethylene carbonate, acetamide, succinonitrile, sulfolane, furfuryl alcohol, N,N-dimethyl-formamide, 2-ethoxyethanol, hexamethylphosphoric amide, 2-nitropropane, nitroethane, gamma-butyrolactone, propylene carbonate 1,2,6-hexanetriol, dipropylene glycol, hexylene glycol, etc. These compounds may be used singly or as a mixture of two or more species as desired. The liquid dispersion medium may preferably be contained in an amount of 40–95 parts, and more preferably 60–85 parts, per 100 parts of the ink.

Even the ink capable of generating a gas due to electrolysis can contain fine particles, such as silica, carbon fluoride, titanium oxide or carbon black, in addition to those as described hereinabove.

In a preferred embodiment, in view of the viscoelastic characteristic of the ink, all or a part of the fine particles may comprise swelling particles (i.e., particles capable of being swelled) which are capable of retaining the above-mentioned liquid dispersion medium therein.

The "swelling particles" used herein refer to particles having a property such that when they are mixed with a liquid dispersion medium, they incorporate the liquid dispersion medium in their internal structure (e.g., between crystal layers) and become swelled. On the other hand ordinary particles other than the swelling particles do not incorporate a liquid dispersion medium in their internal structure or between crystal layers.

More specifically, the swelling particles used in the present invention may preferably show "liquid absorption" as defined below, in the range of 1 ml–1000 ml, more preferably 20 ml–500 ml. The liquid absorption may be measured in the following manner.

A liquid dispersion medium or solvent such as water used in the ink is gradually added to 1 g of powder of the above-mentioned swelling particles, while kneading the resultant mixture. The state of the powder is observed and there is found an amount (or a range of amounts) of the liquid dispersion medium sufficient to convert the powder from a dispersed state into a combined mass, which substantially retains the liquid dispersion medium. At this time, the amount of the liquid dispersion medium added to the powder is the "absorbed liquid".

Examples of such swelling particles may include: fluorinated mica such as Na-montmorillonite, Ca-montmorillonite, 3-octahedral synthetic smectites, Na-hectorite, Li-hectorite, Na-taeniolite, Na-tetrasilicic mica and Li-taeniolite; synthetic mica, silica, etc.

The above-mentioned fluorinated mica may be represented by the following general formula (1).

$$W_{l\text{-}1/3}(X,Y)_{2.5\text{-}3}(Z_4O_{10})F_2 \quad (1),$$

wherein W denotes Na or Li; X and Y respectively denote an ion having a coordination number of 6, such as $Mg^{2+}$, $Fe^{2+}$, $Ni^{2}$, $Nn^{2+}$, $Al^{3+}$, and $Li^{+}$; Z denotes a positive ion having a coordination number of 4 such as $Al^{3+}$, $Si^{4+}$, $Ge^{4+}$, $Fe^{3+}$, $B^{3+}$ or a combination of these including, e.g., ($Al^{3+}/Si^{4+}$).

The swelling particles, in their dry state, may preferably have an average particle size or 0.1–20 microns, more preferably 0.8–15 microns, and most preferably 0.8–8 microns. The content of the swelling particles can be the same as described above with respect to the fine particles, but may more preferably be 8–60 parts per 100 parts of the ink. It is also preferred to use swelling particles having a charge on their surfaces.

In a preferred embodiment of the present invention, in order to control the viscosity of the ink, a polymer soluble in the above-mentioned liquid dispersion medium may be present in an amount of 1–90 wt. parts, more preferably 1–50 parts, particularly preferably 1–20 parts, per 100 parts of the ink material.

Examples of such a polymer include: plant polymers, such as guar gum, locust bean gum, gum arabic, tragacanth, carrageenah, pectin, mannan, and starch; microorganism polymers, such as xanthane gum, dextrin, succinoglucan, and curdran; animal polymers, such as gelatine, casein, albumin, and collagen; cellulose polymers such as methyl cellulose, ethyl cellulose, and hydroxyethyl cellulose; starch polymers, such as soluble starch, carboxymethyl starch, and methyl starch; alginic acid polymers, such as propylene glycol alginate, and alginic acid salts; other semisynthetic polymers, such as derivatives of polysaccharides; vinyl polymers, such as polyvinyl alcohol, polyvinylpyrolidone, polyvinyl methyl ether, carboxyvinyl polymer, and sodium polyacrylate; and other synthetic polymers, such as polyethylene glycol, ethylene oxide-propylene oxide block copolymer; alkyd resin, phenolic resin, epoxy resin, aminoalkyd resin, polyester resin, polyurethane resin, acrylic resin, polyamide resin, polyamide-imide resin, polyester-imide resin, and silicone resin; etc. These polymers may be used singly or in a mixture of two or more species, as desired. Further, there can also be used a grease, such as silicone grease, and a liquid polymer such as polybutene.

The above-mentioned ink may contain as desired, a colorant comprising a dye or pigment generally used in the field of printing or recording, such as carbon black. When the ink contains a colorant, the colorant content may preferably be 0.1–40 parts, more preferably 1–20 parts, per 100 parts of the ink. Instead of or in combination with the colorant, a color-forming compound capable of generating a color under voltage application can be contained in the ink. The ink may further contain an electrolyte capable of providing electroconductivity to the ink, a thickening agent (or viscosity improver), a viscosity-reducing agent, or a surfactant. It is also possible to cause the above-mentioned fine particles per se to function as a colorant.

In order to obtain the ink used in the present invention, a liquid dispersion medium and fine particles as mentioned above may, for example, be mixed in an ordinary manner.

Next, there is described an ink in which its adhesiveness is changed by the above-mentioned third mode (3).

The ink used in the the third mode of the present invention may comprise a crosslinked substance (inclusive of polyelectrolyte) impregnated with a liquid dispersion medium.

Herein, the phrase "crosslinked substance" refers to a single substance which per se can assume a crosslinked structure, or a mixture of (i) a substance capable of assuming a crosslinked structure with the aid of an additive such as crosslinking agent for providing an inorganic ion such as borate ion, and (ii) the additive. Further, the term "crosslinked structure" refers to a three-dimensional structure having a crosslinkage or crosslinking bond. The crosslinkage may be composed of any one or more of a covalent bond, ionic bond, hydrogen bond and van der Waal's bond.

In the ink used in the present invention, the crosslinked structure is only required to be sufficient so that a desired degree of liquid dispersion medium-retaining property is given thereby. More specifically, the crosslinked structure may be any one of a network, a honeycomb, a helix, etc., or may be irregular.

The liquid dispersion medium in the ink used in the present invention may be any inorganic or organic liquid medium which is liquid at room temperature. The liquid medium should preferably have a relatively low volatility, e.g., one equal to or even lower than that of water.

In case where a hydrophilic dispersion medium such as water and an aqueous medium is used as the liquid dispersion medium, the crosslinked substance may preferably be composed of or be derived from a natural or synthetic hydrophilic high polymer or macromolecular substance.

Examples of such polymer include: plant polymers, such as guar gum, locust bean gum, gum arabic, tragacanth, carrageenah, pectin, mannan, and starch; microorganism polymers, such as xanthane gum, dextrin, succionoglucan, and curdran; animal polymers, such as gelatin, casein, albumin, and collagen; cellulose polymers such as methyl cellulose, ethyl cellulose, and hydroxyethyl cellulose; starch polymers, such as soluble starch, carboxymethyl starch, and methyl starch; alginic acid polymers, such as propylene glycol alginate, and alginic acid salts; other semisynthetic polymers, such as derivatives of polysaccharides; vinyl polymers, such as polyvinyl alcohol, polyvinylpyrrolidone, polyvinyl methyl ether, carboxyvinyl polymer, and sodium polyacrylate; and other synthetic polymers, such as polyethylene glycol, ethylene oxide-propylene oxide block copolymer. These polymers may be used singly or in mixture of two or more species, as desired.

The hydrophilic polymer may preferably be used in a proportion of 0.2–50 parts, particularly 0.5–30 parts, with respect to 100 parts of the liquid dispersion medium.

In the ink used in the present invention, a polyelectrolyte may preferably be used as the above-mentioned crosslinked substance. The "polyelectrolyte" used herein refers to a polymer or macromolecular substance having a dissociative group in the polymer chain (i.e., main chain or side chain) thereof.

Examples of the polyelectrolyte capable of providing a poly ion when dissociated in water may include, e.g., natural polymers such as alginic acid and gelatine; and synthetic polymers obtained by introducing a dissociative group into ordinary polymers, such as polystyrenesulfonic acid and polyacrylic acid. Among these polyelectrolytes, an amphoteric polyelectrolyte capable of being dissociated as either an acid or a base, such as a protein, may preferably be used, in order to obtain a desired change in the ink adhesiveness based on electric conduction.

On the other hand, when an oil, such as mineral oil or an organic solvent, such as toluene, is used as the liquid dispersion medium, the crosslinked substance may be composed of or from one or a mixture of two or more compounds selected from metallic soaps inclusive or metal stearates, such as aluminum stearate, magnesium stearate, and zinc stearate, and similar metal salts of other fatty acids, such as palmitic acid, myristic acid, and lauric acid or organic substances such as hydroxypropyl cellulose derivative, dibenzylidene-D-sorbitol, sucrose fatty acid esters, and dextrin fatty acid esters. These crosslinked substances may be used in the same manner as the above-mentioned hydrophilic polymers.

When the hydrophilic polymer, polyelectrolyte or metallic soap, etc., is used, the layer-forming property and liquid dispersion medium—retaining ability of the resultant ink vary to some extent depending on the formulation of these components or combination thereof with a liquid dispersion medium. It is somewhat difficult to determine the formulation or composition of these components in a single way. In the present invention, it is preferred to reduce the amount of a solvent contained in the ink or to enhance the crosslinking degree of the crosslinked substance in order to obtain an ink which comprises a liquid dispersion medium and a crosslinked substance or polyelectrolyte and has substantially no adhesiveness. On the other hand, in order to obtain such an ink having an adhesiveness, it is preferred to increase the amount of a solvent contained in the ink, in a manner opposite to that as mentioned above, or to reduce the crosslinking degree of the crosslinked substance.

The ink capable of changing its adhesiveness by the above-mentioned third mode (3) essentially comprises a liquid dispersion medium and a crosslinked substance (inclusive of polyelectrolyte), as described above, and may further comprise, as desired, a colorant inclusive of a dye, a pigment and colored fine particles, a color-forming compound capable of generating a color under electric conduction, an electrolyte providing electroconductivity or to the ink, or another additive such as an antifungal agent or an antiseptic.

The colorant or coloring agent may be any of the dyes and pigments conventionally used in the field of printing and recording, such as carbon black.

Further, in order to enhance the rubbing resistance of the resultant image, fine particles of an inorganic compound such as colloidal silica, titanium oxide and tin oxide may be added to the ink.

The ink used in the present invention may be obtained from the above components, for example, by uniformly mixing a liquid dispersion medium such as water, a crosslinked substance such as a hydrophilic polymer and/or an polyelectrolyte, and also an optional additive such as a crosslinking agent, a colorant, an electrolyte, etc., under heating as desired, to form a viscous solution or dispersion, which is then cooled a gel state.

Incidentally, when colored particles such as toner particles are used as a colorant, it is preferred that a crosslinked substance and/or an polyelectrolyte, and a liquid dispersion medium are first mixed under heating to form a uniform liquid, and then the colored particles are added thereto. In this case, it is further preferred that the addition of the particles is effected near room temperature so as to avoid the agglomeration of the particles.

The thus obtained ink, when subjected to electric conduction, is at least partially subjected to a change in or to destruction of the crosslinked structure to be reversibly converted from a gel state into a sol state, such that it is selectively imparted with an adhesiveness corresponding to a pattern of the electric conduction. Alternatively, the dissociation state of the polyelectrolyte contained in the ink may change, whereby the ink is selectively imparted with an adhesiveness corresponding to the electric conduction.

When the above-mentioned ink capable of changing its adhesiveness by the third mode (3) is subjected to electric conduction, the pH value of the ink in the neighborhood of an electrode may be changed by an electrochemical reaction. More specifically, the crosslinked structure or dissociative state of an electrolyte may be changed by electron transfer due to the electrode, in order to change the ink adhesiveness.

According to our information, e.g., when a polyvinyl alcohol crosslinked with borate ions is used as the crosslinked substance, the change in the crosslinked structure caused by a pH change may be illustrated as follows.

When the borate ion bonded to the —OH groups of the polyvinyl alcohol, as shown below,

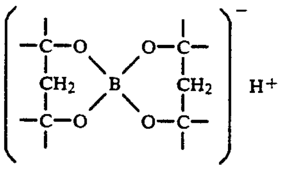

is subjected to an anodic reaction in the neighborhood of an anode (or the addition of an electron acceptor such as hydrochloric acid), the pH of the ink is changed to the acidic side and electrons may be removed from the above-mentioned borate ion to destroy at least a part of the crosslinked structure. Accordingly, the molecular weight of the structure is decreased and its viscosity is lowered, whereby the ink may be imparted with an adhesiveness, selectively. The reaction at this time may presumably be expressed by the following formula:

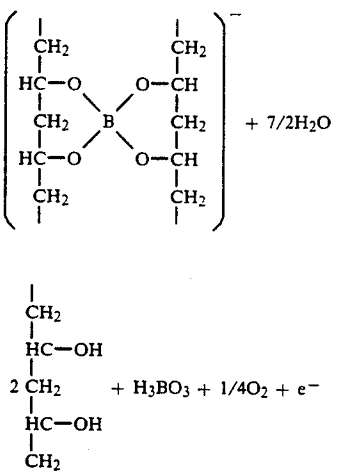

As described hereinabove, according to the present invention, there is provided an image-forming method using an ink capable of changing its adhesiveness under electric conduction, particularly an ink capable of partially or selectively transferring to a printing plate. In the image-forming method of the present invention, because the amount of the ink transferred is controlled by the charge amount used for the electric conduction, it is not necessary to regulate the amount of an ink by means of a large number of rollers as in the conventional printing machine.

Hereinbelow, the present invention will be explained with reference to illustrative Examples.

EXAMPLE 1

A shape-infinite colloid sol ink of black color was prepared by blending for 30 minutes a mixture of the following materials in a homogenizer rotating at 10,000 rpm: 200 g of glycerine, 400 g of lithium niolite ($LiMg_2Li(Si_4O_{10})F_2$ having a mean particle size of 2.5 μm, and 20 g of carbon black, followed by mixing with 200 g of water in a roll mill.

The above-mentioned ink was applied to a stainless steel plate of 1 cm×1 cm plated with platinum so as to form an ink layer of 2 mm thick. Then, another stainless steel sheet plated with platinum of the same size as that mentioned above was placed on the ink and these two stainless steel plates plated with platinum were progressively moved apart from each other without any voltage applied therebetween. It was confirmed that the ink attached to both platinum-plated plates over the entire areas thereof.

A test also was conducted by applying a voltage of +30 V between the pair of platinum-plated stainless steel plates which oppose each other across the 2 mm layer of the ink, using one of the plates as a cathode (grounded) and the other as an anode. The two platinum-plated stainless steel plates were then progressively separated. It was confirmed that all the portion of the ink attached to the plate which served as the anode, while no deposition of ink to the plate which served as the cathode anode was found.

Then, an image forming test operation was conducted by using a printing device shown in FIG. 6, A stainless steel cylindrical roll plated with platinum and having surface roughness of 1S, 30 mm in diameter, was used as the ink carrier roll 1, while an iron cylindrical roll of 30 mm diameter and having hard-chromium-plated surface was used as the plate roll 3. A printing plate 4 patterned with a vinyl resin was wound on the aluminum plate . Then, the above-mentioned ink was supplied into the nip between the ink carrier roll 1 and a coating roll 9. The ink carrier roll 1 was rotated in the direction of an arrow A at a peripheral speed of 5 mm/sec, while the coating roll 9, which was a cylindrical roll having a surface made of Teflon (polytetra fluoroethylene) rubber was rotated in the direction of an arrow E at a peripheral speed of 5 mm/sec, while the gap between these rolls was controlled so as to form an ink layer of 0.2 mm thick on the ink carrier roller 1. The plate roll 3 was rotated in the direction of an arrow B at a peripheral speed of 5 mm/sec.

Then, electrodes **15*f* and 15*g* were immersed in the ink of the ink pool 10 with a spacing of 1 mm from each other. An electric resistance meter as the sensor unit 15*d* was connected between these electrodes. The ink component adding means was so arranged that the opening and closing of the valve 15*b* was manually controllable through the control unit 15*c***.

Printing was conducted with this printing device without applying voltage from the DC power supply 103. In this case, no print of a recorded image was obtained. Printing also was conducted under application of a SC voltage of 30 V from the DC power supply 103. In this case, a print of a sharp image quality was obtained. The application of the DC voltage was conducted by connecting the negative and positive sides of the DC power supply 103 to the plate roll 3 and the ink carrier roll 1, respectively.

In the state immediately after the start of the printing, the ink exhibited an electrical resistivity value of 50 Ω, but the resistivity was increased to 120 Ω, 7 minutes after the start of the printing. Then, the valve **15*b*** was opened to drip water to maintain the variation of the electrical resistivity of the ink within the range between −20 Ω and +20 Ω. As a result, the electrical resistivity was reduced to 57 Ω, i.e., the resistivity value obtained immediately after the start of the printing was recovered. The resistivity did not increase substantially, thus proving that the water was dispersed substantially uniformly.

EXAMPLE 2

Printing was conducted continuously for a long time (20 hours) by the same method and employing the apparatus as in Example 1 except that an electrical conductivity meter was used as the sensor unit 15*d*, whereby a large number of prints was obtained. During the printing, control was conducted so as to maintain the variation in the electrical conductivity of the ink within the range of between −10% and +10%. No degradation of the printed image quality was found even after production of a large number of prints.

EXAMPLE 3

Printing was conducted continuously for a long time (20 hours) by the same method and with the apparatus of Example 1 except that an ampere meter was used as the sensor unit 15*d*, whereby a large number of prints was obtained. During the printing, control was conducted so as to maintain the variation in the electrical current through the ink within the range of between −15% and +15% of 0.5A which was the current value obtained immediately after the start of the printing. No degradation of the printed image quality was found even after production of a large number of prints also in this Example.

Using this recording apparatus, a continuous printing was conducted for 20 hours in an atmosphere of 40° C. and 20% relative humidity (RH) so as to produce a large number of prints. No degradation of printed image was found also in this case.

EXAMPLE 4

An ink was prepared from the following components:

| | |
|---|---|
| Colloidal water-containing silicate (mean particles size 1 μm or less (Commercial name SMEKTON, produced by Kunimine Kogyo Kabushiki Kaisha) | 250 parts |
| Carbon black (Commercial name STEARING R, produced by CABOT Company, USA) | 60 parts |
| Water | 140 parts |
| Glycerine | 280 parts |

The ink preparation was conducted by forming a liquid mixture of water, glycerine and carbon black by mixing them in an attritor for 4 hours, and kneading the liquid mixture together with the colloidal water-containing silicate employing a kneader.

Using this ink, a continuous printing was conducted for 20 hours by the same method and apparatus as used in Example 1, thus obtaining a large number of prints. The addition of water was conducted at a mean rate of 0.4 cc/minute so as to maintain the variation of the electrical resistivity of the ink within the range between −14% and +14% of 30 Ω, which was the value observed immediately after the start of the printing. No degradation of the printed image was found after production of the large number of prints.

EXAMPLE 5

Printing was conducted continuously for a long time (20 hours) by the same method and apparatus as Example 4 except that an electrical conductivity meter was used as the sensor unit 15*d*, whereby a large number of prints was obtained. During the printing, a control was conducted so as to maintain the variation in the electrical conductivity of the ink within a range between −20% and +20%. No degradation of the printed image quality was found even after production of a large number of prints.

EXAMPLE 6

Printing was conducted continuously for a long time (20 hours) by the same method and apparatus as Example 4 except that an ampere meter was used as the sensor unit 15*d*, whereby a large number of prints was obtained. During the printing, a control was conducted so as to maintain the variation in the electrical current through the ink within the range of between −15% and +15% of 0.5A. No degradation of the printed image quality was found even after production of a large number of prints also in this Example.

EXAMPLE 7

A continuous printing was conducted with the same method and apparatus as those in Example 1, except that a mixture liquid composed of 20 g of glycerine and 80 g of water was stored in the tank 15*a* and dripped into the ink pool 10 through the valve 15*b*. During the printing, a control was conducted to maintain the variation of the electrical conductivity of the ink within the range of −10% and +10% by the dripping of the above-mentioned liquid mixture. No degradation of print image quality was found also in this case.

Comparison Example 1

A continuous printing was conducted with the same method and apparatus as in Example 1, except that the ink component adding means 15 was omitted. The electrical resistivity of the ink, which was 60 Ω when the printing was commenced, increased to 700 Ω after 3 hours of printing, resulting in a noticeable degradation in the printed image quality. After 15-hour printing operation, the electrical resistivity was increased to 10 kΩ or higher and the ink failed to provide prints of acceptable quality.

Thus, the electrical resistivity of the ink was increased more than 10 times from that observed immediately after the start of the printing. The water content of the ink, which was 43% immediately after the start of the printing, was reduced to 5% after the 15-hour operation.

Comparison Example 2

A continuous printing was conducted with the same method and apparatus as in Example 4, except that the ink component adding means 15 was omitted. The electrical resistivity of the ink, which was 90 Ω when the printing was commenced, was increased to 950 Ω after 3 hours of printing, resulting in a noticeable degradation in the printed image quality. After 15-hour printing operation, the electrical resistivity was increased to 1.5 kΩ, and the ink failed to provide prints of acceptable quality. Thus, the electrical resistivity of the ink was increased more than 10 times from that observed immediately after the start of the printing. The water content of the ink, which was 19% immediately after the start of the printing, was reduced to 3% after the 15-hour operation.

EXAMPLE 8

A cylindrical member of 30 mm diameter and mm thick was produced by processing a copper type material 10 cL (main components Cu-Sn-C) which is used as the material of a sintered oil-containing bearing (Commercial name: Lubless sintered oil-containing bearing) produced by Nippon Oil Seal Kogyo Kabushiki Kaisha. An image forming apparatus of the type shown in FIG. 8 was formed by using the above-mentioned cylindrical member as the ink carrier roller 1.

On the other hand, a plate was prepared by forming, on an aluminum substrate 4*a*, a non-conductive pattern 4*b* of a photo-resist (17 μm thick, commercial name PEEL APART TYPE NEOTROCK E, produced by Nitto Denko Kabushiki kaisha).

An ink was prepared from materials shown below and was supplied to the nip between the roll 1 and the roll 9 while rotating these rolls at a peripheral speed of 5 mm/sec in the directions of arrows, thereby forming an ink pool 10. The distance between the roll 1 and the roll 9 was adjusted so as to provide a layer of the ink 2 of about 10 μm thick.

In this state, water was supplied from a water supply port (not shown) into the roll 1 and a DC voltage of 30 V was applied between the rolls 1 and 9 by the DC power supply 103, using the rolls 1 and the roll 4 as the plus and minus electrodes, respectively.

As a result, an ink image 8 corresponding to the non-conductive pattern 4*b* was formed on the paper 7. No degradation in the image quality was observed even after a continuous 20-hour printing operation.

| | |
|---|---|
| Glycerine | 100 parts |
| Lithium borofluoride | 10 parts |
| Pigment (Commercial name Supranol Cyanine 78F, produced by Bayer) | 10 parts |
| Hexaglynpolycynolate (Produced by Nikko Chemicals, commercial name: Heraglyn PR-15) | 7 parts |
| Colloidal water-containing silicate (Produced by Kunimine Kogyo Kabushiki Kaisha, commercial name Smekton SA) | 51 parts |

As will be understood from the foregoing description, according to the present invention, it is possible to prevent long term changes in the properties of an ink for printing, so as to make it possible to conduct printing with application of voltage to the ink, stably for a long period of time.

It is also to be understood that the present invention makes it possible to maintain constant values of properties of an ink, thus offering a constant quality of the print image regardless of any change in the environmental condition.

What is claimed is:

1. An image forming method comprising the steps of:

(a) providing a recording composition having an adhesive characteristic which changes corresponding to a polarity of a voltage applied thereto between a pair of electrodes, said recording composition having a transfer characteristic which changes corresponding to a loss of at least one component of said recording composition;

(b) supplying the recording composition between a pair of electrodes;

(c) applying a voltage between the pair of electrodes to adhere the recording composition to one of the pair of electrodes; and (d) adding an additional amount of said at least one component of said recording composition to said recording composition in response to a determined change in said transfer characteristic to compensate for said change, wherein said determined change is a change in a measured value of an electrical characteristic of said recording composition selected from the group consisting of electrical resistivity and electrical conductivity, and a value of an electric current flow to said recording composition.

2. The image forming method according to claim 1, wherein said at least one component is water.

3. The image forming method according to claim 1 including controlling the step of applying a voltage between the pair of electrodes in accordance with said measured value of an electrical characteristic of said recording composition selected from the group consisting of electrical resistivity and electrical conductivity, and a value of an electric current flow to said recording composition.

4. An image forming method according to claim 1 including employing a vessel having a porous peripheral wall for accommodating said additional amount of said at least one component so that said additional amount of said component exudes from surface thereof and is added to said recording composition.

5. The image forming method according to claim 1 further comprising the step of transferring said recording composition attached to said electrode to a recording medium.

6. An image forming method comprising the steps of:

(a) providing a recording composition having an adhesive characteristic which changes corresponding to a polarity of a voltage applied thereto between a pair of electrodes, said recording composition having a transfer characteristic which changes corresponding to a loss of at least one component of said recording composition, and at least one of said electrodes having a pattern comprising an electroconductive portion and an insulating portion;

(b) supplying the recording composition between a pair of electrodes;

(c) applying a voltage between the pair of electrodes to pattern-wise adhere the supplied recording composition to said electrode having said pattern; and (d) adding an additional amount of said at least one component of said recording composition to said recording composition in response to a determined change in said transfer characteristic to compensate for said change, wherein said determined change is a change in a measured value of an electrical characteristic of said recording composition selected from the group consisting of electrical resistivity and electrical conductivity, and a value of an electric current flow to said recording composition.

7. The image forming method according to claim 6 wherein said at least one component is water.

8. The image forming method according to claim 6 including controlling the step of applying a voltage between the pair of electrodes in accordance with said measured value of an electrical characteristic of said recording composition selected from the group consisting of electrical resistivity and electrical conductivity, and a value of an electric current flow to said recording composition.

9. The image forming method according to claim 6 including employing a vessel having a porous peripheral wall for accommodating said additional amount of said at least one component so that said additional amount of said component exudes from a surface thereof and is added to said recording composition.

10. The image forming method according to claim 6 further comprising the step of transferring said recording composition attached to said electrode to a recording medium.

11. An image forming apparatus, comprising:

(a) a pair of electrodes at least one of which has a pattern comprising an electroconductive portion and an insulating portion;

(b) means for supplying a recording composition having a transfer characteristic which changes corresponding to a loss of at least one component of said recording composition between the pair of electrodes;

(c) means for applying a voltage between the pair of electrodes to adhere said recording composition to said electrode having said pattern; and (d) ink component adding means for adding an additional amount of said at least one component of the recording composition to the recording composition in response to a determined change in said transfer characteristic to compensate for said change, wherein said ink component adding means includes sensor means for measuring said determined change by measuring a change in an electrical characteristic of said recording composition selected from the group consisting of electrical resistivity and electrical conductivity, and a value of an electric current flow to said recording component.

12. The image forming apparatus according to claim 11 wherein said ink component adding means includes a pair of electrodes and an orifice for discharging said at least one component.

13. The image forming apparatus according to claim 11 further comprising means for controlling said voltage applied between said pair of electrodes in accordance with a measured value of said electrical characteristic of said recording composition selected from electrical resistivity and electrical conductivity, and a value of an electric current flow to said recording composition.

14. The image forming apparatus according to claim 11, wherein said ink component adding means includes a vessel having a porous peripheral wall.

* * * * *

UNITED STATES PATENT AND TRADEMARK OFFICE

CERTIFICATE OF CORRECTION

PATENT NO. : 5,132,706

DATED : July 21, 1992

INVENTOR(S) : TOSHIYA YUASA ET AL.

It is certified that error appears in the above-identified patent and that said Letters Patent is hereby corrected as shown below:

On the title page and Col. 1, line 5;

"TRANSFERRING INK WITH AN ADHESIVE CHARACTERISTIC CHANGED BY APPLIED VOLTAGE AND REPLACING COMPONENT LOSS OF INK IN RESPONSE TO DETERMINED CHANGES OF INK" should read --IMAGE FORMING METHOD TRANSFERRING INK WITH AN ADHESIVE CHARACTERISTIC CHANGED BY APPLIED VOLTAGE AND REPLACING COMPONENT LOSS OF INK IN RESPONSE TO DETERMINED CHANGES OF INK AND IMAGE FORMING APPARATUS--.

AT [75] INVENTORS

"Motokazu Kobyashi," should read --Motokazu Kobayashi,--.

AT [56] REFERENCES CITED

U.S. Patent Documents, "Larson" should read--Larsen--.

Foreign Patent Documents,
"1671577 3/1972 Fed. Rep. of Germany" should read
--1671577 2/1972 Fed. Rep. of Germany--.

UNITED STATES PATENT AND TRADEMARK OFFICE
CERTIFICATE OF CORRECTION

PATENT NO. : 5,132,706

DATED : July 21, 1992

INVENTOR(S) : TOSHIYA YUASA ET AL.

It is certified that error appears in the above-identified patent and that said Letters Patent is hereby corrected as shown below:

COLUMN 1

Line 2, "TRANSFERRING INK WITH AN ADHESIVE CHARACTERISTIC CHANGED BY APPLIED VOLTAGE AND REPLACING COMPONENT LOSS OF INK IN RESPONSE TO DETERMINED CHANGES OF INK" should read --IMAGE FORMING METHOD TRANSFERRING INK WITH AN ADHESIVE CHARACTERISTIC CHANGED BY APPLIED VOLTAGE AND REPLACING COMPONENT LOSS OF INK IN RESPONSE TO DETERMINED CHANGES OF INK AND IMAGE FORMING APPARATUS--.

Line 52, "U" should be deleted.

COLUMN 3

Line 45, "above-mention-d" should read --above-mentioned--.

COLUMN 5

Line 56, "content" should read --contents--.

COLUMN 7

Line 45, "t1" should read --to--.

COLUMN 8

Line 52, "was" should read --way--.

UNITED STATES PATENT AND TRADEMARK OFFICE
CERTIFICATE OF CORRECTION

PATENT NO. : 5,132,706

DATED : July 21, 1992

INVENTOR(S) : TOSHIYA YUASA ET AL.

It is certified that error appears in the above-identified patent and that said Letters Patent is hereby corrected as shown below:

COLUMN 9

Line 7, "ma" should read --may--.

COLUMN 10

Line 37, "in" should read --ink--.

COLUMN 11

Line 16, "an" should read --a--.

COLUMN 13

Line 22, "been" should be deleted.

COLUMN 15

Line 58, "or" should read --of--.

COLUMN 18

Line 25, "or" (1st occurrence) should be deleted.
Line 41, "cooled a" should read --cooled to a--.

COLUMN 23

Line 12, "kaisha)." should read --Kaisha).--.

UNITED STATES PATENT AND TRADEMARK OFFICE

CERTIFICATE OF CORRECTION

PATENT NO. : 5,132,706

DATED : July 21, 1992

INVENTOR(S) : TOSHIYA YUASA ET AL.

It is certified that error appears in the above-identified patent and that said Letters Patent is hereby corrected as shown below:

COLUMN 24

Line 21, "surface" should read --a surface--.

Signed and Sealed this

Twenty-second Day of December, 1992

*Attest:*

DOUGLAS B. COMER

*Attesting Officer*

*Acting Commissioner of Patents and Trademarks*